(12) United States Patent
Flaster

(10) Patent No.: US 12,349,748 B2
(45) Date of Patent: Jul. 8, 2025

(54) ELONGATED DEVICE TO SEAL A SUBSTRATE

(71) Applicant: Neal Flaster, La Jolla, CA (US)

(72) Inventor: Neal Flaster, La Jolla, CA (US)

( * ) Notice: Subject to any disclaimer, the term of this patent is extended or adjusted under 35 U.S.C. 154(b) by 102 days.

(21) Appl. No.: 17/889,219

(22) Filed: Aug. 16, 2022

(65) Prior Publication Data
US 2023/0049659 A1     Feb. 16, 2023

Related U.S. Application Data

(60) Provisional application No. 63/233,632, filed on Aug. 16, 2021.

(51) Int. Cl.
*D05B 3/12* (2006.01)
*A41D 27/24* (2006.01)
*B29C 65/48* (2006.01)
*B29C 65/50* (2006.01)

(52) U.S. Cl.
CPC ........ *A41D 27/245* (2013.01); *B29C 65/4855* (2013.01); *B29C 65/5042* (2013.01)

(58) Field of Classification Search
CPC ...... A41D 27/245; A41D 31/10; A41H 43/04; B29C 65/4855; B29C 65/5042
See application file for complete search history.

(56) References Cited

U.S. PATENT DOCUMENTS

2015/0356845 A1* 12/2015 Forster ............... G08B 13/2445
340/572.1

* cited by examiner

*Primary Examiner* — Lawrence D Ferguson
(74) *Attorney, Agent, or Firm* — Charles McCloskey

(57) ABSTRACT

An elongated device to seal an edge of a substrate has an elongated flexible linear form capable of rolling, akin to a tape. The tape has its own substrate encapsulated by a polyurethane coating. Upon application of heat, the tape welds to a base layer of a fabric, such as nylon. The tape continuously merges into the base and thus prevents intrusion of fluids and gasses through any stitching or other apertures of the base, including any pathogens, microbes, and viruses in the fluids and gasses. The tape resists over forty washings of the conjoined base part of a garment made from the fabric. The tape has proportions that promote a tight seal of the base and comfortable feel to the skin of a wearer of a garment having the tape upon the fabric.

7 Claims, 1 Drawing Sheet

ELONGATED DEVICE TO SEAL A SUBSTRATE

CROSS-REFERENCE TO RELATED APPLICATION

This non-provisional application claims priority to the provisional application Ser. No. 63/233,632 filed on Aug. 16, 2021 and all applications have a common inventor.

BACKGROUND OF THE INVENTION

The present invention relates to joining textiles in general and provides a washable tape upon single direction water permeable fabric.

Man has his skin and wits as protection from hazards in the world. In the mists of time, man realized skin only protected him so far. Man then protected himself with hides and furs of other animals. As time moved along, man clothed himself in more comfortable and better garments. Man developed buckskin, linen, cloth, cotton, and other natural materials into garments of all description through the centuries. In one century, the fourteenth, man encountered a pronounced plague. Man took his knowledge of visors from armor and made masks for some protection against the black plague.

A few centuries later, man developed artificial fibers to supplement or replace natural components of garments and other uses. Pronounced artificial fiber development occurred with advances in petroleum chemistry and military need during the nineteenth century. Man's natural fiber garments, later armor, and modern artificial fiber garments protect mankind from extremes of temperature, precipitation, dust, projectiles, and the like. Some materials do better at protection from some threats than other materials. Some materials are lighter than others. Nature though still besets man with new threats from time to time.

Throughout this application, where a masculine pronoun is used, the feminine pronoun is implied.

DESCRIPTION OF THE PRIOR ART

In the early nineteenth century, man deployed chemical agents and gases against various armies in various conflicts. In the late twentieth century, various armies and their materiel agencies developed protective suits once more against chemical, biological, and radiological agents. The suits, often call MOPP suits, had a rugged exterior over an activated charcoal liner. The suits had two pieces that made the wearer feel hot promptly. The suits had a useful life of approximately four to twelve hours upon exposure to an agent. The suit was worn once and discarded.

Also, during the twentieth century, Dupont® of Wilmington, DE developed high density polyethylene fibers into Tyvek®. Tyvek appeared as wraps for houses in the 1980s and as envelopes to the present day. In the late twentieth century, Tyvek suits appeared for construction workers, painters, miners, and hazardous materials workers. The Tyvek suits fit over boots and gloves made by others and worn by users. The Tyvek suit uses elastic cuffs at the wrist and the ankle that gather the Tyvek material at those active joints. The Tyvek suit has a popular coverall construction that a user dons through one opening along a zipper closed front. The top of the Tyvek suit has a hood with a drawing string or elastic constricted opening for the user's face. Though the Tyvek suit protects most of a user's body, the suit leaves some or all of the user's face exposed. Though the Tyvek suit protects most of a user's limbs, the suit leaves a user's hands and feet exposed. With the exposed face and hand and feet openings, the Tyvek suit does not retain air pressure within it.

Though high-density polyethylene fiber base fabric was described, man has used and developed additional fabrics. The fabrics provide the components of a garment following a pattern. The components though generally call for joining upon seams. For ordinary garments, sewn seams work remarkably well. The garment maker adjusts the sewing and stitch patterns to conceal most stitching. However, stitching still penetrates a fabric thus providing an aperture for intrusion of water, water vapor, dust, and bigger particles.

Though preceding description has referred to construction settings, the description also applies to clinical, medical, laboratory, and center locations. While the above-described devices fulfill their respective, particular objectives and requirements, the aforementioned devices do not describe an Elongated Device to Seal a Substrate. Therefore, a need exists for new and improved Elongated Device that can be used to join fabrics, particularly, Nylon® or polyamide or copolymer, using high temperature without altering waterproof characteristics of the fabric joined by the Elongated Device. In this regard, the present invention substantially fulfills this need. In this respect, the Elongated Device according to the present invention substantially departs from the conventional concepts and designs of the prior art, and in doing so provides a device primarily developed for the purpose of ejecting particulate matter from the suit and thwarting particulate matter from entering the suit.

The Elongated Device to Seal a Substrate overcomes the above-mentioned disadvantages and drawbacks of the prior art. As such, the general purpose of the present invention, which will be described subsequently in greater detail, is to provide a new and improved Elongated Device which has all the advantages of the prior art mentioned heretofore and many novel features that result in Elongated Device which are not anticipated, rendered obvious, suggested, or even implied by the prior art, either alone or in any combination thereof.

SUMMARY OF THE INVENTION

The Elongated Device to Seal a Substrate, or tape, has an elongated flexible linear form capable of rolling. The tape has its own substrate encapsulated by a polyurethane coating. Upon application of heat, the tape welds to a base layer of a fabric, such as nylon. The tape continuously merges into the base and thus prevents intrusion of fluids and gasses through any stitching or other apertures of the base, including any pathogens, microbes, and viruses in the fluids and gasses. The tape resists over forty washings of the conjoined base part of a garment made from the fabric. The tape has proportions that promote a tight seal of the base and comfortable feel to the skin of a wearer of a garment having the tape upon the fabric.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved Elongated Device to Seal a Substrate that prevents intrusion of water through it.

Still another object of the present invention is to provide an Elongated Device to Seal a Substrate that extends continuously.

Still another object of the present invention is to provide an Elongated Device to Seal a Substrate that withstands over forty washings.

Still another object of the present invention is to provide an Elongated Device to Seal a Substrate that avoids separating from a seam.

Still another object of the present invention is to provide an Elongated Device to Seal a Substrate that avoids peeling of its own edge from a fabric.

Still another object of the present invention is to provide an Elongated Device to Seal a Substrate that operates in a compatible manner with hydrophobic fabrics as it transmits heat from a wearer to the surrounding environment.

Still another object of the present invention is to provide an Elongated Device to Seal a Substrate that prevents any pathogens, microbes, and viruses from passing through it.

Still another object of the present invention into provide an Elongated Device to Seal a Substrate that prevents any poisons from passing through it.

Still another object of the present invention is to provide an Elongated Device to Seal a Substrate may be easily and efficiently manufactured and marketed to the consuming.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
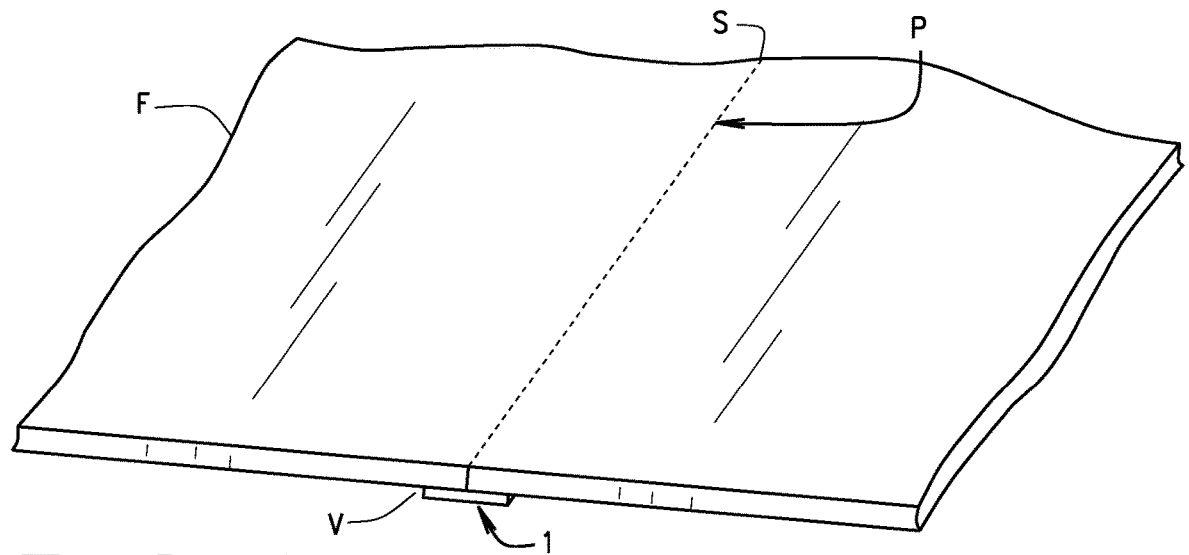
FIG. 1 shows a perspective view of fabric utilizing the invention.

Referring now to the drawings, and particularly to FIGS. 1-5 a preferred embodiment of the Elongated Device to Seal a Substrate of the present invention is shown by the reference numeral 1. The invention may be abbreviated as Elongated Device.

FIG. 1 provides a perspective view of fabric F utilizing the invention 1 beneath a seam S. The fabric has its outward surface shown upward in the figure, that is, the surface outward from a person wearing a garment made of the fabric F. This fabric also serves as a thermally activated wick with its upper hydrophobic polyurethane layer upon a nylon base. The seam S has a pattern P of stitching suitable for the joining of the fabric F as desired for the garment or other use of it. The stitching through operating of mechanized needles imparts a tight pattern of holes, mostly filled by bobbin thread, but with residual gaps and apertures around the thread.

Though this description and the figures often refer to a fabric, the Applicant foresees preparation and assembly of the invention upon a host of garments ranging from gowns, shirts, pants, trousers, to hat and upon other fabric equipment such as tarps, tents, rainflies, sails, and like flexible products that repel water as a key component of their effectiveness. The references to a garment serve as an example because the invention installs upon or becomes other devices and equipment where waterproof, gas impermeable, and dustproof properties have importance to a user. To begin waterproofing the seam S, the fabric F has an overlap V of adjacent fabric pieces.

Figure 2:
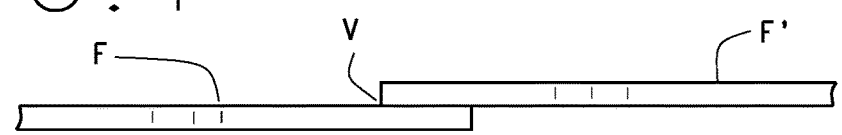
FIG. 2 describes a side view of a fabric seam.
Figure 3:
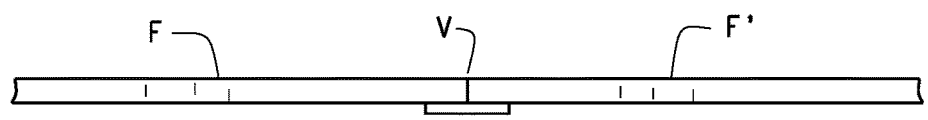
FIG. 3 shows a side view of a fabric seam using the present invention.

The overlap V may take various forms as shown in FIG. 2 from the side and practiced by the industry. FIG. 2 depicts an overlap joint between two adjacent pieces of fabric, F, F'. FIG. 3 then shows a joint of adjacent fabric pieces F, F' with their edges abutting as at V. This forms the fabric pieces, F, F' into a common plane. Beneath the seam S, the invention 1 has its finished location beneath the pattern P of the stitching previously shown in FIG. 1. The invention merges to the base, preferably nylon, as later described. The invention also seals hems or pockets that secure elastic, as at a cuff for a wrist or an ankle of a garment at the selection of the wearer.

Figure 4:
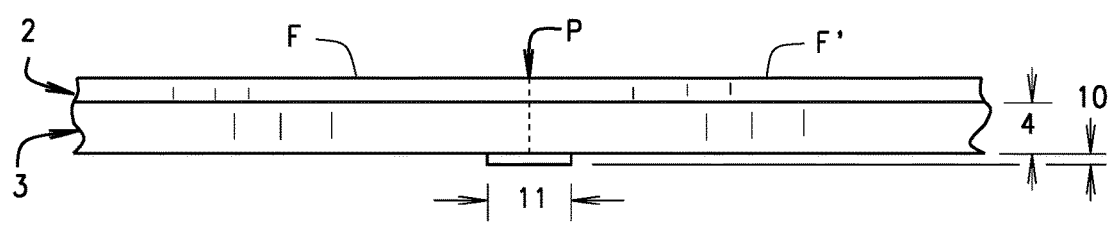
FIG. 4 is an enlarged view of the invention deployed upon a seam.

Turning to FIG. 4, it shows an enlarged view of the invention 1 at the pattern P of a seam S between two fabric pieces, F, F'. Each fabric piece has an upper layer, as at 2, of hydrophobic polyurethane with a microscopic porous structure, the upper layer may also take the form of a coating. The upper layer further functions as a durable water repellent with six or fewer perfluorinated carbon atoms per molecule. The upper layer rejects, or repels exterior liquids, and any germs contained therein. The upper layer also permits passage of water vapor outwardly through the fabric. The water vapor arises from perspiration heated by the wearer of the garment made with the invention. More particularly in an alternate embodiment, the upper layer 2 serves as a barrier laminate. A barrier laminate may include two or more layers of polymer film that adhere to a scrim upon application of heat and pressure at a mill. The barrier laminate thus has a uniform and strong bond of the seam S.

Beneath the upper layer, each piece has a base 3, typically nylon though other fabrics are envisioned. The base provides the concealment, warmth, and color desired by the wearer of a garment of this fabric. The base also supports the upper layer and provides the mechanical support for the pattern P of the stitching of the seam S, as previously shown. The base has its thickness, as shown at 4, generally in fractions of a millimeter.

The seam S comes together and has the pattern P of stitching securing the two pieces of fabric F, F'. And beneath the base of each piece, the invention 1 merges. The invention has an elongated flexible form, or tape. FIG. 4 shows the invention upon an edge as it fits over the stitching pattern P. The invention 1 appears beneath the base of each piece as the invention merges to the base opposite the upper layers. The invention has its thickness, as at 10, and its width, as at 11, perpendicular to the thickness. Upon installation, the invention merges smoothly to the bases of each piece so that the wearer of a garment does not notice the invention upon his skin. The invention when in garment form, includes sewn in radio frequency identification devices, or RFID, and universal product codes, or UPC codes, commonly called bar codes, stamped along and adjacent to a seam of a garment.

The base of each piece has a thickness 4 ranging from 0.10 millimeters to 0.75 millimeters. The invention 1, or tape, has its own thickness 10 ranging from 0.05 millimeters to 0.20 millimeters. The invention 1 then has its width 11 ranging from 0.1 millimeters to 0.75 millimeters. The base to tape thickness has a ratio from 1:4 to 3:1 and the base to tape width has a ratio from 10:100 to 15:2. To lessen detection by the wearer and abrasion to his skin, the Applicant suggests a base to tape thickness of about 2:1 and a base to tape width of about 5:1. The tape of the invention 1 merges across at least one half of its width with the base. In the preferred embodiment, the tape merges with the base across the entire width of the tape, Though this description mentions fabric, different uses of fabric, such being made into garments, will call for different weights per square meter.

Figure 5:
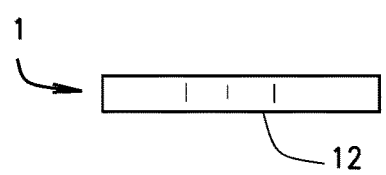
FIG. 5 is a sectional view of the tape of the invention.

And, FIG. 5, shows a section view through the invention 1 laterally as the invention may see use at various lengths. The invention 1 has its tape like elongated flexible form. The invention has its own thin, rectangular shape as at 12, preferably of a hydrophobic polyurethane. Using the invention 1 upon fabric F, F', the invention 1 endures a 750° C. welding tip. The invention 1, particularly as shown in FIGS. 1, 4, 5 is impermeable to water, whether liquid or vapor, including substances and pathogens dissolved in the water, or alternatively other solvents, powders, and gasses. Put another way, the invention produces a seam on a garment that is impermeable to pathogens dissolved in water, aqueous solutions, nonaqueous solutions, powders, and gasses.

The invention welds to the base 3 continuously, that is, without a gap. The invention's outer cover withstands high temperatures and especially withstands at least 40 washings in a commercial laundry. As a reminder, the invention merges, welds, and joins with the base, typically nylon. In an alternate embodiment, the Elongated Device may have a substrate of various flexible plastic, polymer, or a composite material, within a polymer cover.

The present invention joins a fabric having a seam between two pieces of fabric. The fabric has a base and an outer layer, or a coating and a tape, or a flexible elongated device welds, or joins to the base opposite the seam. The seam itself thus becomes impermeable to fluids carrying a dissolved pathogen, powders carrying a pathogen, and gasses carrying a pathogen. The fabric has its base that itself has a thickness and the tape, or flexible elongated device, also has its own thickness and width. The ratio of the thickness of the base to the thickness of the tape, or flexible elongated device, has a ratio from about 1:4 to about 3:1, while the ratio of the thickness of the base to the width of the tape, or flexible elongated device, has a ratio from about 10:100 to about 15:2.

More particularly, the ratio of the thickness of the base to the thickness of the tape is from about 1.8:1 to 2.2:1 so the tape avoids perception, or detection by a wearer of, a garment with the tape and the ratio of the thickness of the base of the fabric to the width of the tape is also from about 4.5:1 to 5.5:1 again to avoid perception or detection by a wearer. The tap of the invention joins the seam between two pieces of fabric and the coating, or outer layer, withstands up to and including 750° C. of temperature. Preferably, the tape, or the flexible elongated device, welds or joins continuously to the seam. The tape, or the flexible elongated device, also uses hydrophobic polyurethane. With this construction, the present invention withstands at least forty washings.

Alternatively, the invention includes a method to fill gaps within a seam between two pieces of fabric. This method provides a flexible elongated device with a substrate and a polymer coating upon it. Then places the flexible elongated device upon the seam. And then the method heats the flexible elongated device up to and including 750° C. thus causing the polymer coating to expand or to liquefy and fill gaps in the seal resulting in the seam being impermeable to pathogens dissolved in water, aqueous solutions, nonaqueous solutions, powders, and gasses.

While a preferred embodiment of the Elongated Device to Seal a Substrate has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any flexible material such as plastic, polymer, composite, bamboo for the substrate and various formulations of polyurethane may be used instead of the present description. The invention has a construction of a washable, water impermeable, gap filling material that prevents intrusion of exterior fluids into a seam of a garment.

Although providing an Elongated Device to Seal a Substrate, it should be appreciated that the Elongated Device herein described is also suitable for use in garments for persons working in houses, offices, medical offices, laboratories, medical laboratories, light industrial facilities, warehouses, garages, motor pools, select mines, and the like where an Elongated Device user dons a garment with a waterproof seam.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations have been set forth in order to provide a thorough understanding of the illustrative embodiments. However, it will be apparent to one skilled in the art that the present invention may be practiced, without the specific details. In other instances, well known features are omitted or simplified in order not, to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods, and systems for carrying out the several purposes of the present invention. Therefore, the claims include such equivalent constructions insofar as they do not depart from the spirit and the scope of the present invention.

I claim:

1. A fabric comprising:
    a seam between two pieces of the fabric;
    the fabric having a base and an outer layer;
    a flexible elongated device having a polyurethane coating and then welded to said base opposite said seam wherein the welding of said flexible elongated device attains a stiffness that escapes notice by a wearer of the fabric; and
    said seam being impermeable to fluids carrying a dissolved pathogen, powders carrying a pathogen, and gasses carrying a pathogen.

2. The fabric of claim 1, further comprising:
    said base having a thickness;
    said flexible elongated device having a thickness and a width;
    a ratio of the thickness of said base to the thickness of said flexible elongated device in a ratio from about 1:4 to about 3:1; and
    a ratio of the thickness of said base to the width of said flexible elongated device in a ratio from about 10:100 to about 15:2.

3. The fabric of claim 2 further comprising:
    the ratio of the thickness of said base to the thickness of said device being from about 1.8:1 to 2.2:1 wherein said device is adapted to avoid detection by a wearer; and
    the ratio of the thickness of said base to the width of said device being from about 4.5:1 to 5.5:1 wherein said device is adapted to avoid detection by a wearer.

4. The fabric of claim 3 where in said coating withstands up to and including 750° C.

5. The fabric of claim 4 wherein said flexible elongated device herein includes hydrophobic polyurethane.

6. The fabric of claim 4 further comprising:
    said flexible elongated device welding continuously to said seam.

7. The fabric of claim 4 wherein said flexible elongated device is adapted to withstand forty washings.

* * * * *